Patented July 6, 1954

2,683,085

UNITED STATES PATENT OFFICE 2,683,085

PROCESS FOR THE RECOVERY OF METALS OR METAL ALLOYS FROM IRON CLAD THEREWITH

Karl Löhberg, Oberursel, Taunus, Germany, assignor to Metallgesellschaft Aktiengesellschaft, Frankfurt am Main, Germany, a corporation of Germany No Drawing. Application July 17, 1950, Serial No. 174,372

Claims priority, application Germany September 14, 1949

6 Claims. (Cl. 75—63)

1

This invention relates to a process for the recovery of metals or metal alloys from iron clad therewith.

Sheet iron or sheet iron scrap clad especially with copper or copper alloys is treated, for the purpose of recovering the cladding metals by the wet method, the cladding metals being anodically dissolved in alkaline copper I cyanide solution or ammoniacal solutions and again cathodically separated, whilst the core metal comes out of the process unaffected. The manipulation with these baths, however, is often unpleasant, and over and beyond that, the current yields are frequently not very satisfactory. Moreover especially in the case of metal sheets clad with copper-nickel alloys it has not been possible to recover the cladding metals as such or as alloys. On the contrary in this case, both metals are obtained in the form of their hydroxides, which must either be smelted or worked up to other compounds.

Dry process for the recovery of the cladding metals are also known, in which either vapours containing sulphur or solid calcium sulphide are caused to act on the iron clad with copper, nickel or their alloys at high temperature. By this means the sulphides of the cladding metals are produced, which are caused to flake off, for example, by dipping the hot metal sheets in water or in another suitable manner, whereupon the sulphides are subjected to the complicated process of copper ore smelting. This necessitates an increased expenditure of fuels and apparatus, and in addition, complicated refining processes have to be applied for the recovery of the several alloying components. These disadvantages are not overcome by the known proposal to smelt the copper-clad iron together with copper matte, or sulphur-containing intermediate products of copper smelting or copper ore containing sulphur. In this case the core metal must be melted down also and again worked up to metal from the sulphide, so that further complicated operations and increased operating costs result.

The present invention aims at enabling iron clad with metals or alloys to be worked up in simple and economically more advantageous manner, without the metals having to be first converted into their salts and recovered therefrom as is the case in the known processes.

The process according to the invention consists in that the iron clad with metals or their alloys is brought into contact with molten magnesium, for example is dipped thereinto, the cladding layer being dissolved in the magnesium

2 within a short time, whereas the iron remains as such unaffected. The invention can be applied to iron clad with, for example, copper, nickel, tin or alloys thereof such as brass, bronze, German silver or the like, or other metals soluble in magnesium, such as chromium, cadmium, zinc or the like or alloys thereof, the iron being for example, in the form of sheet metal, pipes, rods, sheet metal or stamping waste, scrap or waste and the like.

Depending on the temperature at which the dissolving process is carried out, the magnesium can dissolve different quantities of metals, e. g., copper, nickel, tin or the like. In carrying out the invention, temperatures of about 650 to 1050° C. preferably 700 to 800° C. are applied, it being preferable to leave the clad iron in contact with the molten magnesium for sufficient time so that the whole cladding layer is dissolved. In order to prevent burning of the magnesium at high temperatures, the molten metal is advantageously kept out of contact with atmospheric oxygen in a suitable manner. For this purpose, for example salt layers, e. g. chlorides and/or fluorides of magnesium alone or on occasion mixed with salts of the alkali or alkaline earth metals, for example the halides thereof can be used. It is also possible to work in an atmosphere of a protective gas, for example by using inert gases or sulphur, sulphur dioxide or the like provided that the sulphur content of the protective atmosphere has no unfavourable effect on the resulting cladding metals.

The magnesium-copper-nickel alloy resulting for example at the dissolution of a copper-nickel cladding layer can be used as such, for example as hardener for aluminium alloys intended to include these three metals, or also as addition to cast iron for obtaining a spherulitic structure of the graphite, by which means an improvement of the properties of gray cast iron is attained.

It is, however, also possible to distil off the magnesium in a known manner, in a second operation any desired magnesium content of the product finally yielded being adjustable by selection of suitable distillation periods. If, for example the copper-nickel or other metals or alloys recovered in accordance with the invention are to be used again as such, for cladding purposes or the like, the residual magnesium can be removed by distillation. In case more easily volatile metals, for example, cadmium, zinc or the like are present, these can be separated from the magnesium by rectifying distillation, for example according to the method of the known refined zinc column.

Example

Sheet iron scrap clad on both sides with an alloy consisting of 84% Cu and 16% Ni were dipped in molten magnesium heated to about 730° C. which was covered with a salt mixture composed of magnesium halides and alkaline metal halides. The clad material remained about 10 minutes in the molten magnesium, so that all the coating metal was dissolved. Thereupon the sheet iron was taken out of the magnesium bath, the adherent melt being easily scraped off. The core metal completely freed from the clad layer showed no signs of any attack. The analysis of the magnesium melt showed 70.7% Mg, 24.6% Cu and 4.6% Ni; only traces of iron were detected.

The magnesium content in the resulting product is, of course, dependent on the amount of dissolving metal used as well as on the thickness of the layer of the cladding metals on the iron parts. The content of the cladding metals in the magnesium melt can be increased, if necessary by repeating the treatment, since the metals are highly soluble in molten magnesium at the temperatures employed. The magnesium, containing, according to the example, copper and nickel, was thereupon heated in a vacuum oven at a temperature of approximately 1000° C. under a pressure of about 1 mm. Hg. The magnesium vapour condensed in the cooled condenser, the residue contained in addition to copper and nickel still only 2.8% Mg. This can also be removed from the residue by using higher temperatures, so that finally a practically pure copper-nickel-alloy is produced.

What I claim is:

1. A process for removing cladding from iron which is clad with a metallic cladding selected from the group consisting of copper, nickel, tin, chromium, cadmium, zinc and mixtures of such metals which comprises contacting the clad metal with molten magnesium at a temperature below the melting point of the iron until the cladding is dissolved by the molten magnesium.

2. A process for removing cladding from iron which is clad with a metallic cladding selected from the group consisting of copper, nickel, tin, chromium, cadmium, zinc and mixtures of such metals which comprises immersing the clad metal in a bath of molten magnesium protected against atmospheric oxygen by a layer of a molten salt at a temperature below the melting point of the iron until the cladding is dissolved by the molten magnesium.

3. A process for removing cladding from iron which is clad with a metallic cladding selected from the group consisting of copper, nickel, tin, chromium, cadmium, zinc and mixtures of such metals which comprises immersing the clad metal in a bath of molten magnesium provided with an ambient inert gas of atmosphere at a temperature below the melting point of the iron until the cladding is dissolved by the molten magnesium.

4. A process for removing cladding from iron which is clad with a metallic cladding selected from the group consisting of copper, nickel, tin, chromium, cadmium, zinc and mixtures of such metals which comprises contacting the clad metal with molten magnesium at a temperature below the melting point of the iron until the cladding is dissolved by the molten magnesium and distilling magnesium off from the resulting metal mixture containing the cladding metals and magnesium to concentrate the cladding metals.

5. The process of claim 1 in which the temperature of said molten magnesium is between about 650° C. and 1050° C.

6. The process of claim 1 in which the temperature of said molten magnesium is between about 700° C. to 800° C.

References Cited in the file of this patent

UNITED STATES PATENTS

| Number | Name | Date |
| --- | --- | --- |
| 1,513,875 | Wilke | Nov. 4, 1924 |
| 1,562,472 | Pedersen | Nov. 24, 1925 |
| 1,669,485 | Nordling et al. | May 15, 1928 |
| 2,077,990 | Day | Apr. 20, 1937 |
| 2,124,564 | Gilbert et al. | July 26, 1938 |
| 2,133,327 | Jollivet | Oct. 18, 1938 |
| 2,527,037 | Smalley | Oct. 24, 1950 |

FOREIGN PATENTS

| Number | Country | Date |
| --- | --- | --- |
| 419,665 | Great Britain | Nov. 12, 1934 |
| 536,258 | Great Britain | May 8, 1941 |

OTHER REFERENCES

Metal Industry, Sept. 16, 1949, page 233, "Light-Metal Scrap."